United States Patent
Caule

(10) Patent No.: US 8,428,795 B2
(45) Date of Patent: Apr. 23, 2013

(54) METHOD AND SYSTEM FOR PREDICTING THE POSSIBILITY OF COMPLETE STOPPAGE OF AN AIRCRAFT ON A LANDING RUNWAY

(75) Inventor: Nicolas Caule, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1020 days.

(21) Appl. No.: 12/162,466

(22) PCT Filed: Feb. 13, 2007

(86) PCT No.: PCT/FR2007/000247
§ 371 (c)(1),
(2), (4) Date: Jul. 28, 2008

(87) PCT Pub. No.: WO2007/093698
PCT Pub. Date: Aug. 23, 2007

(65) Prior Publication Data
US 2009/0048724 A1 Feb. 19, 2009

(30) Foreign Application Priority Data
Feb. 17, 2006 (FR) .................................... 06 01395

(51) Int. Cl.
*G08G 5/02* (2006.01)
(52) U.S. Cl.
USPC ........................................... 701/16; 340/951
(58) Field of Classification Search .................. 701/3–6, 701/8–10, 14, 16, 18; 340/945, 951
See application file for complete search history.

(56) References Cited

U.S. PATENT DOCUMENTS

| | | | |
|---|---|---|---|
| 4,316,252 A * | 2/1982 | Cooper | 701/16 |
| 4,554,545 A * | 11/1985 | Lowe | 340/980 |
| 5,142,478 A * | 8/1992 | Crook | 701/16 |
| 5,745,054 A * | 4/1998 | Wilkens | 340/972 |
| 5,745,863 A * | 4/1998 | Uhlenhop et al. | 701/14 |
| 2001/0052562 A1* | 12/2001 | Ishihara et al. | 244/175 |
| 2002/0040263 A1* | 4/2002 | Johnson et al. | 701/17 |
| 2003/0052816 A1* | 3/2003 | Snodgrass et al. | 342/357.03 |
| 2004/0030465 A1* | 2/2004 | Conner et al. | 701/16 |
| 2004/0044446 A1* | 3/2004 | Staggs | 701/16 |
| 2004/0167685 A1* | 8/2004 | Ryan et al. | 701/16 |
| 2005/0270180 A1* | 12/2005 | Ishihara et al. | 340/968 |

FOREIGN PATENT DOCUMENTS

WO 01/57827 8/2001

OTHER PUBLICATIONS

International Search Report dated Jun. 14, 2007 w/ English translation.
Written Opinion of the International Searching Authority with English translation, dated Jun. 14, 2007.

* cited by examiner

*Primary Examiner* — Thomas Black
*Assistant Examiner* — Ce Li
(74) *Attorney, Agent, or Firm* — Dickinson Wright PLLC

(57) ABSTRACT

Method and system for predicting the possibility of complete stoppage of an aircraft on a landing runway. According to the invention: a) the altitude (H) of the aircraft (2) is measured and the horizontal distance (D) separating said aircraft (2) from the proximal end threshold (4) of the landing runway (1) is calculated; b) an estimated finishing position (21) of said aircraft on said landing runway (1) is calculated on the basis of the altitude (H) and of the horizontal distance (D) determined in a), as well as on the basis of the angle of approach ($\alpha$); and c) said estimated finishing position (21) calculated in b) is utilized to determine said possibility.

20 Claims, 2 Drawing Sheets

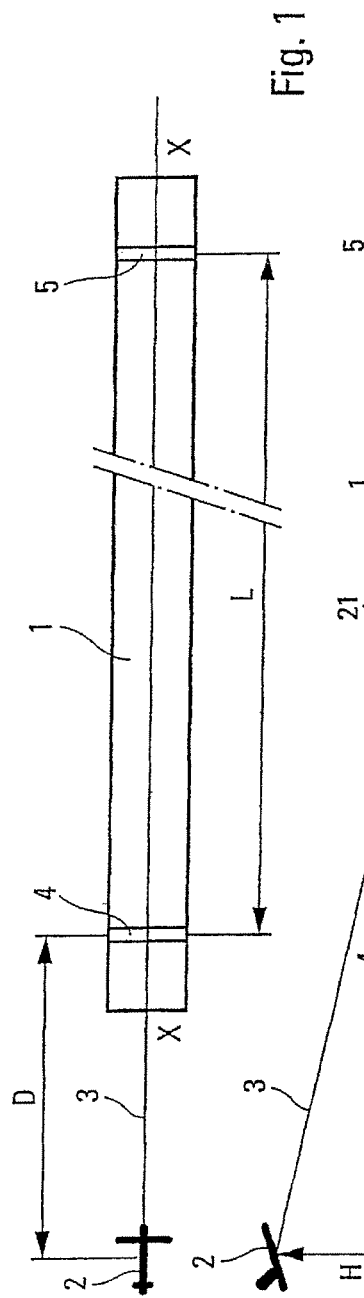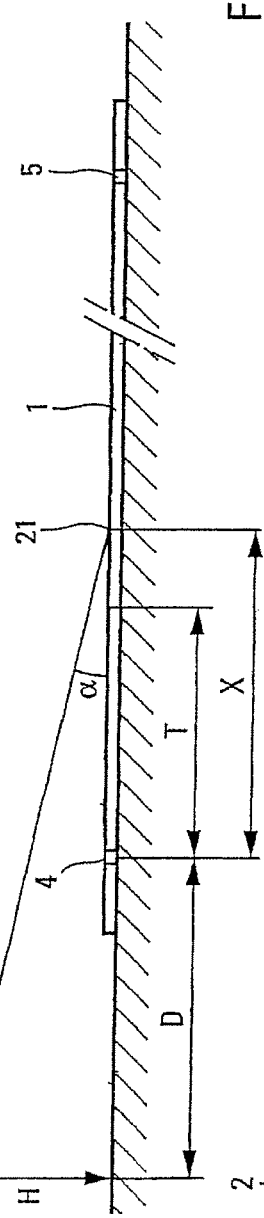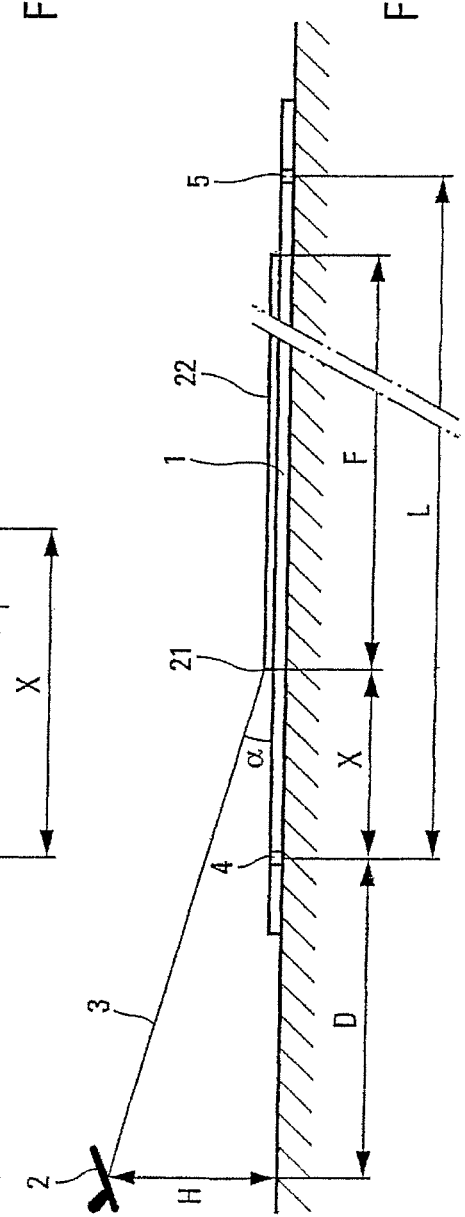

METHOD AND SYSTEM FOR PREDICTING THE POSSIBILITY OF COMPLETE STOPPAGE OF AN AIRCRAFT ON A LANDING RUNWAY

FIELD OF THE INVENTION

The present invention relates to a method and a system for predicting the possibility for an aircraft to stop completely on a landing runway.

BACKGROUND OF THE INVENTION

It is known that, on landing, an aircraft may exit the landing runway longitudinally, at the extremity of the latter, because of the fact, for example, that said aircraft, at the end of its approach trajectory, has touched the runway too far from the proximal runway threshold (one then speaks of a "long landing"). Such an accident may be made worse by an excessive landing speed.

A system called the "Runway Awareness and Advisory System" is known in the prior art, which provides the pilot of an aircraft in the final landing phase, that is to say rolling on the runway while being braked, with a spoken information cue relating to the length of runway remaining to be traversed before the distal threshold of said runway. Such an information cue is very useful, but it is belated and cannot provide an alert regarding an overly long landing.

Additionally, landing aid systems for aircraft following an approach trajectory are known for example through documents U.S. Pat. No. 5,142,478 and WO 01/57827. Such systems therefore make it possible to provide alerts in due time so as to make appropriate arrangements for correcting the approach or for a go-around. However, the first of these documents requires that dedicated transmission means be put in place on the ground, while the second is complex, taking into account a plurality of parameters, including an estimated deceleration rate.

SUMMARY OF THE INVENTION

The object of the present invention is to remedy these drawbacks by virtue of a simple method and system that are able to make it possible to avoid accidents involving longitudinal exit from the landing runway extremity and therefore to improve the safety of flights.

For this purpose, according to the invention, the method for predicting the possibility for an aircraft to stop completely, during its landing, on a landing runway, while said aircraft is still in flight and descending towards said landing runway following an inclined approach trajectory forming an angle of approach with said landing runway, said landing runway comprising two end thresholds, is noteworthy in that:
a) the altitude of said aircraft is measured and the horizontal distance separating said aircraft from the proximal end threshold of said landing runway is calculated;
b) an estimated finishing position of said aircraft on said landing runway is calculated on the basis of the altitude and of the horizontal distance determined in a), as well as on the basis of said angle of approach; and
c) said finishing position estimated in b) is utilized to determine said possibility.

Thus, by virtue of the present invention, an information cue regarding the fact that the landing will or will not be long can be obtained in a simple manner, even before the aircraft contacts the landing runway, thus affording time to take measures to remedy the drawbacks of a long landing such as this.

In order that the precision regarding the estimated finishing position is as good as possible, said steps a) and b) are performed in a repetitive manner during at least part of the descent of the aircraft on said approach trajectory.

The angle of approach used in step b) can be provided by a database relating to the landing runway. As a variant, this angle of approach can be calculated aboard the aircraft, on the basis of the inertial information delivered by the onboard inertial platform.

Preferably, the altitude used in step d) is provided by a radioaltimeter. For its part, the horizontal distance, separating said aircraft from the proximal end threshold of said landing runway, can be obtained on the basis of positioning information for said aircraft delivered by a satellite positioning system and information delivered by a database containing at least the positioning of the proximal threshold of said landing runway.

In a particularly simple form of implementation of the method in accordance with the present invention, said estimated finishing position is defined by its distance X to said proximal end threshold and this distance X is chosen equal to $X = (H/\tan \alpha) - D$, in which expression H is the altitude of the aircraft on the approach trajectory, $\tan \alpha$ is the tangent of the angle of approach $\alpha$ and D is the horizontal distance separating the aircraft from said proximal end threshold.

It will be noted that such a definition of the estimated finishing position, which allows simple calculations, is however not exact, since it neglects the landing flareout between the end of the approach trajectory and the landing runway. However, the lack of precision resulting therefrom is of no consequence, since account can be taken thereof in step c) of the method.

It will be noted moreover that, for a different purpose from that of the present invention—namely the determination of the position of an aircraft with respect to a landing runway and not the prediction of stoppage thereon—document U.S. Pat. No. 4,316,252 also uses an estimated finishing position, determined on the basis of the altitude of the aircraft and the angle of approach. However, in the system of document U.S. Pat. No. 4,316,252, the distance between the estimated finishing position and said proximal threshold of the landing runway is assumed known (whereas, in the present invention, this distance is the unknown to be determined) and the horizontal distance between the aircraft and said proximal threshold is the unknown to be determined (whereas, in the present invention, the latter distance is precalculated elsewhere on the basis of positioning information relating to the aircraft and said proximal threshold).

For the implementation of step c), it is possible to, for example:
compare said distance between said estimated finishing position and said proximal threshold of the landing runway with a reference limit value, short of which said aircraft must be able to stop completely on said landing runway and beyond which said aircraft cannot stop thereon; or else
add an estimated landing distance to said distance between said estimated finishing position and said proximal end threshold, then compare the sum of distances thus obtained with the length of the landing runway.

In the first case, said reference limit value can be determined by experience or by calculation: it depends of course on the type of the aircraft, its braking performance, the state of the runway, the meteorological conditions, etc. In the second case, said estimated landing distance can be a fixed precaution value, or be calculated in real time on the basis of a landing performance database, or else arise from a dynamic model for calculating stopping distance. In both cases, safety margins can be incorporated into said reference limit value and into said estimated landing distance, inter alia to take account of the landing flareout, as mentioned above.

If said distance between the estimated finishing position and said proximal end threshold is greater than said reference limit value, or else if said sum of distances is greater than the length of the landing runway, it is possible to:

emit one or more alarms (audible, luminous, etc.) for the attention of the crew, who can then undertake a go-around and a re-takeoff; and/or command an automatic go-around and re-takeoff of the aircraft by way of the automatic pilot of the aircraft.

Provision may be made moreover to display on a screen, in particular that called the "Navigation Display" in the aeronautical art, a diagram representative of the landing in progress illustrating the runway, the runway thresholds, the approach trajectory, the estimated finishing position, said reference limit value and/or the estimated landing distance, etc. and, by way of alarm, make some of these elements flash and/or represent them in vivid colors, in particular should it be impossible for the aircraft to stop completely before the distal end threshold of said landing runway.

In order to avoid disturbing the crew of the aircraft with one or more inopportune alarms when the aircraft is no longer in a state to take off again in complete safety, provision may be made to disable in this case said alarms and the command of the automatic pilot. Such a disabling may be provided for when at least one of the following three conditions is realized:

the radioaltitude is below an altitude threshold, for example equal to 1.5 m;

the speed of the aircraft relative to the air is below a speed threshold, for example equal to the takeoff speed; and the landing gear of the aircraft is compressed, thus indicating that the latter is already rolling on the landing runway.

Additionally, prior to step a), it is possible to examine, for the landing runways closest to the aircraft in flight, those on which the latter can envisage performing a landing. Accordingly, it is possible to check one or more of the following conditions:

the aircraft is in a landing configuration;

the altitude of the aircraft corresponds to a preparation for landing value;

the alignment of the aircraft with one or more runways; and the horizontal distance of the aircraft with the proximal thresholds of said runways.

For the implementation of steps a) and b) of the method in accordance with the present invention, use is advantageously made of a system comprising calculation means:

receiving:
the altitude (H) of said aircraft descending towards a landing runway following an inclined approach trajectory forming an angle of approach ($\alpha$) with said landing runway;
positioning information for said aircraft; and
positioning information for at least the proximal end threshold of said landing runway; and
calculating:
the horizontal distance (D) separating said aircraft from said proximal end threshold; and
the distance (X) defined by the equation:

$$X = (H/\tan \alpha) - D$$

in which tan $\alpha$ is the tangent of the angle of approach $\alpha$.

Said calculation means can, according to the two cases mentioned above:

perform the comparison of said calculated distance X with said reference limit value and generate an alert signal when said calculated distance X is greater than said reference limit value; or else perform the sum of said calculated distance X and of said estimated landing distance, then compare said sum with the length of the landing runway and generate an alert signal when said sum is greater than said length of the landing runway.

BRIEF DESCRIPTION OF THE DRAWINGS

The figures of the appended drawing will elucidate the manner in which the invention may be carried out. In these figures, identical references designate similar elements.

FIG. 1 is a schematic view from above of a landing runway towards which an aircraft is executing an approach maneuver.

FIG. 3 schematically illustrates a first exemplary implementation of the method in accordance with the present invention.

FIG. 4 schematically illustrates a second exemplary implementation of said method.

DETAILED DESCRIPTION OF THE INVENTION

Figure 2:
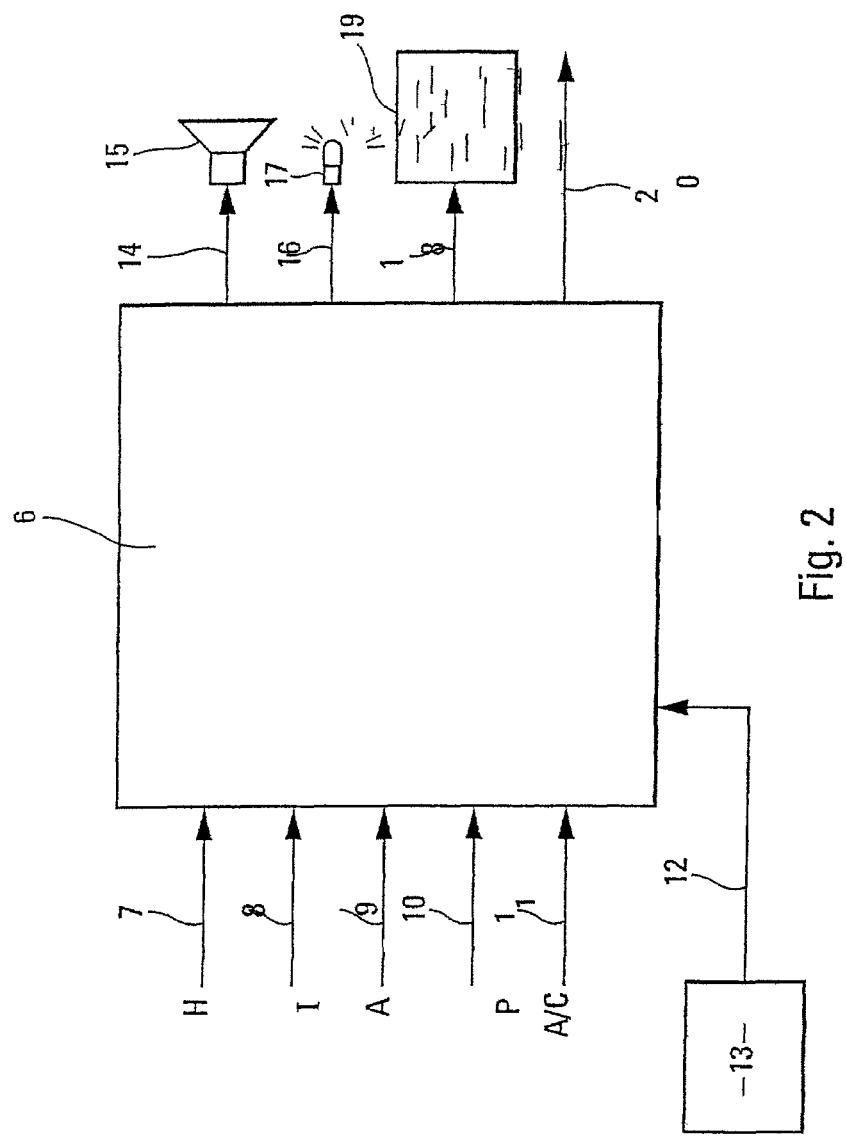
FIG. 2 is the schematic diagram of a system mounted aboard said aircraft and allowing the latter to implement the method in accordance with the present invention.

Represented as a schematic view from above in FIG. 1 are a landing runway 1 and an aircraft 2. The latter is at least approximately aligned with the axis X-X of said landing runway 1 and is descending towards the latter following an inclined approach trajectory 3 (see FIGS. 3 and 4). The landing runway 1 is delimited by two end thresholds 4 and 5, between which is defined the length L of said runway. The aircraft is on the side of the end threshold 4, which is therefore the proximal threshold, the end threshold 5 consequently being the distal threshold.

Mounted aboard the aircraft 2 are calculation means 6 making it possible to implement the method in accordance with the present invention. Accordingly, in the example of FIG. 2, the calculation means 6 comprise:

an input 7 receiving the radioaltitude H measured by the onboard radioaltimeter or radioaltimeters;

an input 8 receiving the inertial parameters I generated by the onboard inertial platform;

an input 9 receiving the anemometric parameters A generated by the onboard anemometric sensors;

an input 10 receiving the position P of the aircraft 2 provided by a satellite positioning system;

an input 11 receiving information A/C specific to the aircraft 2, such as the configuration of its airfoils, the retracted or deployed state of the thrust reversers of its engines, the operating state of its engines, its braking and landing characteristics, etc.; and an input 12, linked to an airport database 13 containing the characteristics of at least the landing runway 1, the coordinates of the thresholds 4 and 5, the length L, the state of said runway (water, snow, ice, runway open or closed), etc.

Additionally, in the example of FIG. 2, the calculation means 6 comprise:

an output 14, able to activate an audible alarm device 15;
an output 16, able to activate a luminous alarm device 17;
an output 18, able to activate an electronic display system 19, for example the Navigation Display; and
an output 20, able to command the automatic pilot of the aircraft 2.

The angle of approach α, used in the manner indicated hereinafter by the calculation means 6, can be calculated by the latter on the basis of the inertial information I or else be given by the airport database 13.

Moreover, by virtue of the information contained in the latter database and the information P received on the input 10, the calculation means 6 determine the horizontal distance D separating the aircraft 2 from the proximal end threshold 4.

On the basis of the height H, the horizontal distance D and the angle of approach α, the calculation means 6 determine, preferably in a repetitive manner during the descent of the aircraft 2 towards the landing runway 1, a distance X=(H/tan α)−D, defining, with respect to the proximal end threshold 4, an estimated finishing position 21 of the approach trajectory 3 (and therefore of the aircraft 2) on said landing runway 1 (see FIGS. 3 and 4).

In the exemplary implementation represented in FIG. 3, the calculation means 6 compare said distance X with a reference limit value T, determined, by experimentation or by calculation, in such a way that, if X is less than T, the aircraft 2 must be able to stop on the landing runway 1 before its distal threshold 5, whereas, if conversely X is greater than T (case represented in FIG. 3), the aircraft 2 has no chance of stopping before said distal threshold 5 and can but exit at the end of the landing runway 1 if it continues its landing. The reference limit value T is dependent on the type of the aircraft 2, its braking performance, meteorological conditions, the landing runway 1, etc. It can be established by experimentation or by calculation.

In the exemplary implementation of the invention, represented in FIG. 4, the calculation means 6 add an estimated landing distance F to said estimated distance X and compare the sum X+F with the length L of the landing runway 1. This estimated landing distance F can be a fixed value predetermined by calculation or by experience, or else be calculated in real time by the calculation means 6 on the basis of a landing performance database (not represented). The estimated landing distance F can take into account, in addition to the mass of the aircraft 2 and its aerodynamic configuration, the elevation of the runway 1, the state of the latter, the speed of the airplane relative to the recommended approach speed, a possible tailwind, faults affecting the landing distance (thrust reversers, engines, antiskid and autobraking devices, etc.). The importance of these various parameters is generally published in the FCOM (Flight Crew Operating Manual) onboard manual.

If the sum X+F is less than the length L (case represented in FIG. 4), the aircraft 2 must be able to stop on the landing runway 1 before the distal threshold 5. On the other hand, if the sum X+F is greater than the length L, the aircraft 2 must expect a longitudinal runway exit, at the extremity of the latter.

If, according to the case, X is greater than T or X+F is greater than L, the calculation means 6 generate an alert signal on these outputs, so that the audible 15 and luminous 17 alarms are activated to draw the attention of the pilot of the aircraft 2 to the gravity of the situation. Moreover, on the screen 19, can be displayed a diagram analogous to the diagram of FIG. 3 or to that of FIG. 4, according to the case, with flashing elements and/or elements represented in vivid colors.

Thus, the pilot is alerted and can interrupt the landing in progress and go around in good time—while the airplane 2 is still on the approach trajectory—so as to take off again.

Optionally, the alert signal emitted by the calculation means 6 and appearing on the output 20 can directly command the automatic pilot of the aircraft 2 in respect of an automatic go-around and re-takeoff of the latter.

It will readily be understood that, with the aid of the information that the calculation means 6 receive on their inputs 7 to 12, the aircraft 2 can, before undertaking a landing maneuver on a determined runway 1, calculate for each of a plurality of runways 1 close to it:
the distance D;
the alignment with respect to the axis X-X; and
the altitude H.

Moreover, it can check whether its configuration corresponds to that of a landing, so that it can determine that or those of said runways on which it can envisage performing a landing.

The invention claimed is:

1. A method for determining the possibility of an aircraft coining to a complete stop, during landing, on a landing runway, the determination being made while said aircraft is in flight and descending towards said landing runway at an inclined approach trajectory forming an angle of approach (α) with said landing runway, said landing runway comprising two end thresholds, wherein the method comprises the steps of:
   a1) measuring altitude (H) of said aircraft,
   a2) calculating horizontal distance (D) from said aircraft to a proximal end threshold of said landing runway, wherein said horizontal distance (D) is calculated based on positioning information for said aircraft delivered by a satellite positioning system and on information delivered by a database containing positioning of said proximal end threshold of the landing runway;
   b) calculating an estimated finishing position of said aircraft on said landing runway based on the measured altitude (H), the calculated horizontal distance (D) and the angle of approach (α), such that the estimated finishing position is defined by a distance (X) from the proximal end threshold with $X=(H/\tan \alpha)-D$, wherein:
   H is the measured altitude of the aircraft,
   tan α is the tangent of the angle of approach (α), and
   D is the calculated horizontal distance; and
   c) determining the possibility of the aircraft coming to a complete stop on the landing runway according to said estimated finishing position, wherein said distance (X) is compared with a reference limit value (T), short of which said aircraft is determined to come to a complete stop on said landing runway and beyond which said aircraft is determined to not come to a complete stop on said landing runway.

2. The method as claimed in claim 1, wherein said steps a1), a2) and b) are performed in a repetitive manner during at least part of the descent of the aircraft on said approach trajectory.

3. The method as claimed in claim 1, wherein said angle of approach (α) is calculated aboard the aircraft.

4. The method as claimed in claim 1, wherein said angle of approach (α) is provided by a database containing information relating to said landing runway.

5. The method as claimed in claim 1, wherein step c) further comprises emitting an alarm for the attention of the crew of the aircraft.

6. The method as claimed in claim 1, wherein step c) further comprises a go-around and in an automatic re-takeoff of the aircraft.

7. The method as claimed in claim 1, wherein at least step c) is disabled when the aircraft, while landing, is no longer in a state to take off again in complete safety.

8. The method as claimed in claim 1, wherein, prior to step a1), a check is carried out to verify landing runways located closest to the aircraft.

9. A system that determines the possibility of an aircraft coming to a complete stop during landing on a runway, the system comprising a calculation device configured to implement the steps of the method of claim 1,
wherein the calculation device:
receives:
the altitude (H) of said aircraft descending towards said landing runway following said inclined approach trajectory forming the angle of approach ($\alpha$) with said landing runway;
positioning information for said aircraft; and
positioning information for at least the proximal end threshold of said landing runway; and
calculates:
the horizontal distance (D); and
the distance (X).

10. An aircraft, comprising the system of claim 9.

11. An aircraft, comprising a calculation device configured to implement the steps of the method of claim 1.

12. A method for determining the possibility of an aircraft coming to a complete stop, during landing, on a landing runway, the determination being made while said aircraft is in flight and descending towards said landing runway at an inclined approach trajectory forming an angle of approach ($\alpha$) with said landing runway, said landing runway comprising two end thresholds, wherein the method comprises the steps of:
a1) measuring altitude (H) of said aircraft,
a2) calculating horizontal distance (D) from said aircraft to a proximal end threshold of said landing runway, wherein said horizontal distance (D) is calculated based on positioning information for said aircraft delivered by a satellite positioning system and on information delivered by a database containing positioning of said proximal end threshold of the landing runway;
b) calculating an estimated finishing position of said aircraft on said landing runway based on the measured altitude (H), the calculated horizontal distance (D) and the angle of approach ($\alpha$), such that the estimated finishing position is defined by a distance (X) from the proximal end threshold with $X = (H/\tan \alpha) - D$, wherein:
H is the measured altitude of the aircraft,
tan $\alpha$ is the tangent of the angle of approach ($\alpha$), and
D is the calculated horizontal distance; and
c) determining the possibility of the aircraft coming to a complete stop on the landing runway according to said estimated finishing position, wherein an estimated landing distance (F) is added to said distance (X), and a sum of said distance (X) and said estimated landing distance (F), (X+F), is compared with a length (L) of the landing runway.

13. The method as claimed in claim 12, wherein said steps a1), a2) and b) are performed in a repetitive manner during at least part of the descent of the aircraft on said approach trajectory.

14. The method as claimed in claim 12, wherein said angle of approach ($\alpha$) is calculated aboard the aircraft.

15. The method as claimed in claim 12, wherein said angle of approach ($\alpha$) is provided by a database containing information relating to said landing runway.

16. The method as claimed in claim 12, wherein step c) further comprises emitting an alarm for the attention of the crew of the aircraft.

17. The method as claimed in claim 12, wherein step c) further comprises a go-around and in an automatic re-takeoff of the aircraft.

18. The method as claimed in claim 12, wherein at least step c) is disabled when the aircraft, while landing, is no longer in a state to take off again in complete safety.

19. The method as claimed in claim 12, wherein, prior to step a1), a check is carried out to verify landing runways located closest to the aircraft.

20. A system that determines the possibility of an aircraft coming to a complete stop during landing on a runway, the system comprising a calculation device configured to implement the steps of the method of claim 12,
wherein the calculation device:
receives:
the altitude (H) of said aircraft descending towards said landing runway following said inclined approach trajectory forming the angle of approach ($\alpha$) with said landing runway;
positioning information for said aircraft; and
positioning information for at least the proximal end threshold of said landing runway; and
calculates:
the horizontal distance (D); and
the distance (X).

* * * * *